United States Patent
Gill (10) Patent No.: US 6,597,546 B2
(45) Date of Patent: Jul. 22, 2003

(54) TUNNEL JUNCTION SENSOR WITH AN ANTIFERROMAGNETIC (AFM) COUPLED FLUX GUIDE

(75) Inventor: Hardayal Singh Gill, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 217 days.

(21) Appl. No.: 09/837,953

(22) Filed: Apr. 19, 2001

(65) Prior Publication Data

US 2002/0154452 A1 Oct. 24, 2002

(51) Int. Cl.[7] ............................................. G11B 5/39
(52) U.S. Cl. .................................... 360/321; 360/324.2
(58) Field of Search ........................... 360/321, 324.2, 360/313; 338/32 R; 324/252

(56) References Cited

U.S. PATENT DOCUMENTS

| | | | |
|---|---|---|---|
| 5,032,945 A | 7/1991 | Argyle et al. ............... 360/126 |
| 5,446,613 A | 8/1995 | Rottmayer .................. 360/113 |
| 5,465,185 A | * 11/1995 | Heim et al. ............ 360/324.11 |
| 5,515,221 A | 5/1996 | Gill et al. .................... 360/113 |
| 5,627,704 A | 5/1997 | Lederman et al. .......... 360/113 |
| 5,731,937 A | 3/1998 | Yuan .......................... 360/113 |
| 5,822,158 A | 10/1998 | Matsuzono ................. 360/113 |
| 5,898,547 A | 4/1999 | Fontana, Jr. et al. ........ 360/113 |
| 5,901,018 A | * 5/1999 | Fontana et al. .......... 360/324.2 |
| 5,905,611 A | 5/1999 | Yoda et al. ................. 360/113 |
| 5,930,087 A | 7/1999 | Brug et al. ................. 360/113 |
| 5,995,339 A | 11/1999 | Koshikawa et al. ........ 360/113 |
| 6,005,753 A | * 12/1999 | Fontana et al. .......... 360/324.2 |
| 6,064,552 A | 5/2000 | Iwasaki et al. ............. 360/113 |
| 6,101,072 A | 8/2000 | Hayashi ...................... 360/324 |
| 6,344,954 B1 | * 2/2002 | Redon et al. ............ 360/324.2 |
| 6,381,107 B1 | * 4/2002 | Redon et al. ............ 360/324.2 |
| 6,504,689 B1 | * 1/2003 | Gill et al. ................. 360/324.2 |
| 6,519,124 B1 | * 2/2003 | Redon et al. ............ 360/324.2 |
| 2002/0135949 A1 | * 9/2002 | Gill ........................... 360/324.2 |
| 2002/0154452 A1 | * 10/2002 | Gill ............................. 360/321 |
| 2002/0181165 A1 | * 12/2002 | Gill ............................. 360/321 |
| 2002/0181166 A1 | * 12/2002 | Gill ............................. 360/321 |

FOREIGN PATENT DOCUMENTS

| | | |
|---|---|---|
| JP | 6267034 | 9/1994 |
| JP | 8339514 | 12/1996 |
| JP | 9251612 | 9/1997 |
| JP | 11-353621 | * 12/1999 |
| JP | 2000076628 | 3/2000 |
| WO | WO 97/16823 | 5/1997 |

* cited by examiner

Primary Examiner—Brian E. Miller
(74) Attorney, Agent, or Firm—Ervin F. Johnston (57) ABSTRACT

A magnetic read head includes a tunnel junction sensor that has front and back surfaces that are recessed from the ABS and a flux guide that includes a ferromagnetic flux guide body with front and back surfaces wherein the front surface forms a portion of the ABS and the back surface is magnetically coupled to the tunnel junction sensor. A flux guide body has a middle portion between first and second side portions and first and second antiferromagnetic layers wherein the first antiferromagnetic layer is magnetically coupled to the first side portion and the second antiferromagnetic layer is magnetically coupled to the second side portion for pinning magnetic moments of the first and second side portions so that only a magnetic moment of the middle portion defines a track width of the sensor and responds to field signals from a rotating magnetic disk. The first and second antiferromagnetic layers have side walls which are perpendicular to the ABS and spaced apart by the track width. Each of the front surface of the tunnel junction sensor and the back surface of the flux guide have a width as measured parallel to the ABS and to the major planes of the layers that is greater than the track width.

30 Claims, 6 Drawing Sheets

FIG. 9
(SIDE)

FIG. 10
(ABS)

FIG. 11 (TOP)

FIG. 12 (SIDE)

FIG. 13 (ABS)

FIG. 14 (TOP)

TUNNEL JUNCTION SENSOR WITH AN ANTIFERROMAGNETIC (AFM) COUPLED FLUX GUIDE

BACKGROUND OF THE INVENTION

1. Field of the Invention

The present invention relates to a tunnel junction sensor with an antiferromagnetic (AFM) coupled flux guide and, more particularly, to such a sensor wherein first and second antiferromagnetic layers pin first and second portions of the flux guide at an ABS leaving a highly permeable middle portion which responds to signal fields.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a tunnel junction sensor for sensing the magnetic signal fields from the rotating magnetic disk. The sensor includes a nonmagnetic electrically nonconductive tunneling or barrier layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. The tunnel junction sensor is located between ferromagnetic first and second shield layers. First and second leads, which may be the first and second shield layers, are connected to the tunnel junction sensor for conducting a sense current therethrough. The sense current is conducted perpendicular to the major film planes (CPP) of the sensor as contrasted to a spin valve sensor where the sense current is conducted parallel to the major film planes (CIP) of the spin valve sensor. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is parallel to the ABS, is when the sense current is conducted through the sensor without magnetic field signals from the rotating magnetic disk.

When the magnetic moments of the pinned and free layers are parallel with respect to one another the resistance of the tunnel junction sensor to the sense current ($I_s$) is at a minimum and when their magnetic moments are antiparallel the resistance of the tunnel junction sensor to the sense current ($I_s$) is at a maximum. Changes in resistance of the tunnel junction sensor is a function of cos θ, where θ is the angle between the magnetic moments of the pinned and free layers. When the sense current ($I_s$) is conducted through the tunnel junction sensor, resistance changes, due to signal fields from the rotating magnetic disk, cause potential changes that are detected and processed as playback signals. The sensitivity of the tunnel junction sensor is quantified as magnetoresistive coefficient dr/R where dr is the change in resistance of the tunnel junction sensor from minimum resistance (magnetic moments of free and pinned layers parallel) to maximum resistance (magnetic moments of the free and pinned layers antiparallel) and R is the resistance of the tunnel junction sensor at minimum resistance. The dr/R of a tunnel junction sensor can be on the order of 40% as compared to 10% for a spin valve sensor.

The first and second shield layers may engage the bottom and the top respectively of the tunnel junction sensor so that the first and second shield layers serve as leads for conducting the sense current $I_s$ through the tunnel junction sensor perpendicular to the major planes of the layers of the tunnel junction sensor. The tunnel junction sensor has first and second side surfaces which are normal to the ABS. First and second hard bias layers abut the first and second side surfaces respectively of the tunnel junction sensor for longitudinally biasing the magnetic domains of the free layer. This longitudinal biasing maintains the magnetic moment of the free layer parallel to the ABS when the read head is in the quiescent condition.

Magnetic head assemblies, wherein each magnetic head assembly includes a read head and a write head combination, are constructed in rows and columns on a wafer. After completion at the wafer level, the wafer is diced into rows of magnetic head assemblies and each row is lapped by a grinding process to lap the row to a predetermined air bearing surface (ABS). In a typical tunnel junction read head all of the layers are exposed at the ABS, namely first edges of each of the first shield layer, the seed layer, the free layer, the barrier layer, the pinned layer, the pinning layer and the second shield layer. Opposite edges of these layers are recessed in the head. The barrier layer is a very thin layer, on the order of 20 Å, which places the free and pinned layers very close to one another at the ABS. When a row of magnetic head assemblies is lapped there is a high risk of magnetic material from the free and pinned layers being smeared across the ABS to cause a short therebetween. Accordingly, there is a strong-felt need to construct magnetic head assemblies with tunnel junction heads without the risk of shorting between the free and pinned layers at the ABS due to lapping.

A scheme for preventing shorts across the barrier layer of the tunnel junction sensor is to recess the tunnel junction sensor within the head and provide a flux guide between the ABS and the sensor for guiding flux signals from the rotating magnetic disk. Typically, the ferromagnetic material of the flux guide is required to be stabilized by hard bias layers on each side of the flux guide. With track widths of 1 μm or more this stabilization of the flux guide has been acceptable. However, with submicron track widths, such as 0.1 μm to 0.2 μm, the hard biasing of the flux guide renders the magnetization of the flux guide too stiff to adequately respond to flux signals from the rotating magnetic disk. The reason for this is because flux guides, regardless of the track width, are magnetically stiffened about 0.1 μm on each side of the flux guide by the hard biasing layers. When the track width is above 1 μm, this does not render the flux guide unacceptable since a remainder of the width of the flux guide remains relatively soft for responding to field signals from the rotating magnetic disk. Another way of stating the problem is that with submicron track widths the hard bias renders the flux guide with low permeability. Since a flux guide needs a height of approximately 0.25 µm to 0.5 µm the field signal from the rotating magnetic disk is nonexistent or insignificant at the tunnel junction sensor because of the lack of permeability of the flux guide. Accordingly, there is a strong-felt need to provide a submicron track width tunnel junction sensor with a flux guide that has high permeability.

SUMMARY OF THE INVENTION

In the present invention the tunnel junction sensor has front and back surfaces which are recessed from the ABS and the flux guide has a ferromagnetic flux guide body with front and back surfaces wherein the front surface forms a portion of the ABS and the back surface is magnetically coupled to the tunnel junction sensor. The flux guide body has first and second side portions and a middle portion with the middle portion being located between the first and second side portions. First and second antiferromagnetic layers are provided wherein the first antiferromagnetic layer is magnetically coupled to the first side portion and the second antiferromagnetic layer is magnetically coupled to the second side portion for pinning magnetic moments of the first and second side portions so that only a magnetic moment of the middle portion of the flux guide defines a track width of the sensor and responds to field signals from a rotating magnetic disk. The first and second antiferromagnetic layers have side walls which are perpendicular to the ABS and are spaced apart by the track width. This is important so that when the head is lapped at the ABS the track width remains constant. Each of the front surface of the tunnel junction and the back surface of the flux guide has a width as measured parallel to the ABS and the major planes of the layers that is greater than the track width. In this manner the tunnel junction may be made significantly larger so as to have less resistance to the tunneling current ($I_T$). Further, the present invention provides a middle portion of the flux guide body which is highly permeable so as to respond to signal fields from the rotating magnetic disk.

In a first embodiment of the present invention, first and second antiferromagnetic layers interface the first and second side portions of the flux guide body. In a second embodiment of the invention, first and second ferromagnetic layers are provided. A first antiparallel coupling layer is also provided and located between and interfacing each of the first ferromagnetic layers and the first side portion of the flux guide body so as to antiparallel couple the first ferromagnetic layer and the first portion of the flux guide body. A second antiparallel coupling layer is also provided between and interfacing each of the second ferromagnetic layer and the second side portion of the flux guide body so as to antiparallel couple the second ferromagnetic layer with the second side portion of the flux guide body. A first antiferromagnetic layer is exchange coupled to the first ferromagnetic layer for pinning a magnetic moment of the first ferromagnetic layer parallel to the ABS and to major planes of the layers so that the magnetic moment of the first side portion of the flux guide is pinned antiparallel thereto. A second antiferromagnetic layer is exchange coupled to the second ferromagnetic layer for pinning a magnetic moment of the second ferromagnetic layer parallel to the ABS and to the major planes of the layers so that the magnetic moment of the second side portion of the flux guide is pinned antiparallel thereto. Accordingly, by an antiparallel coupling for each of the first and second side portions of the flux guide the magnetic moments of the first and second side portions are strongly pinned parallel to the ABS and to the major planes of the layers. This strong pinning is an improvement over even the first embodiment discussed hereinabove. A still further embodiment includes first and second hard bias layers interfacing the first and second side portions of the flux guide respectively for biasing the magnetic moments of the first and second side portions in the same direction as the pinned directions of the magnetic moments of the first and second side portions of the flux guide.

An object of the present invention is to provide a flux guide for a tunnel junction sensor wherein the flux guide can be lapped at the ABS without changing a track width.

Another object is to provide a flux guide with a highly permeable narrow track width at the ABS and a wider portion recessed in the head and magnetically coupled to a tunnel junction sensor which is also wider than the track width.

A further object is to provide a pinning of first and second side portions of a flux guide body which pinning is supported by hard bias layers on each side of the flux guide body wherein the flux guide body has a wide portion recessed in the head which is wider than the track width and which is magnetically coupled to a tunnel junction sensor which is also wider than the track width.

Still another object is to provide various methods for making the above flux guides and tunnel junction sensors.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
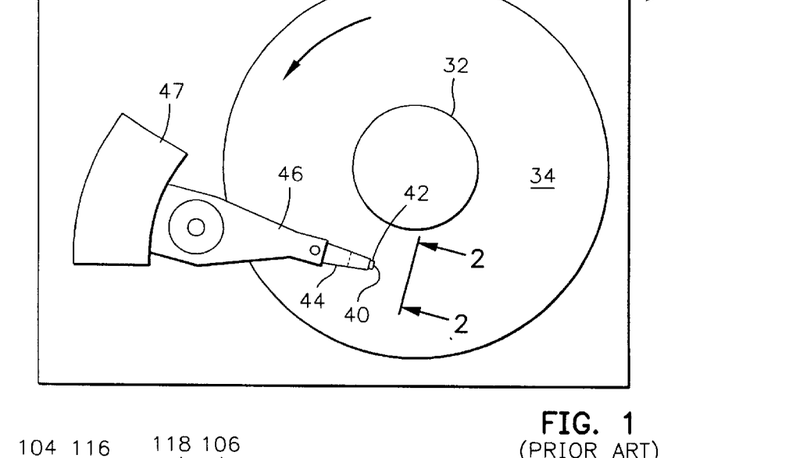
FIG. 1 is a plan view of an exemplary magnetic disk drive.
Figure 2:
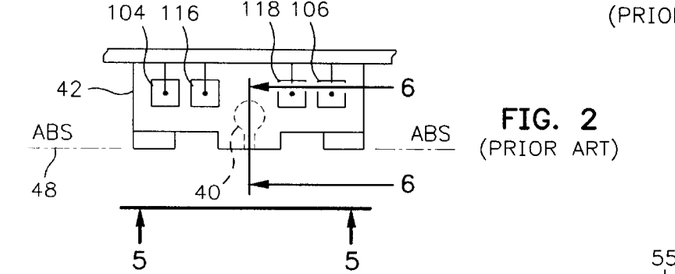
FIG. 2 is an end view of a slider with a magnetic head of the disk drive as seen in plane 2—2 of FIG. 1.
Figure 3:
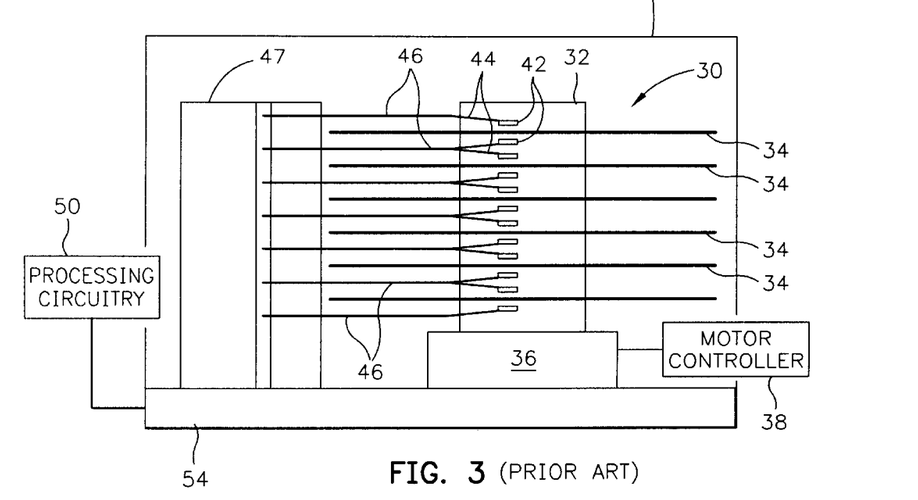
FIG. 3 is an elevation view of the magnetic disk drive wherein multiple disks and magnetic heads are employed.
Figure 4:
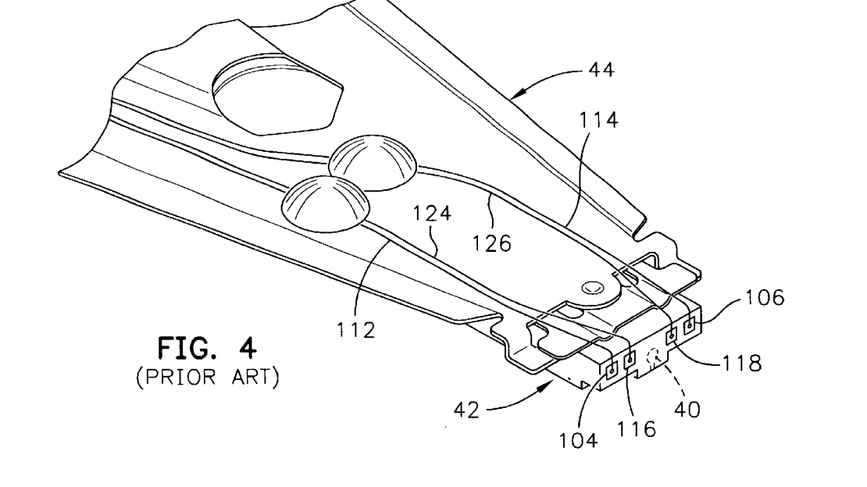
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
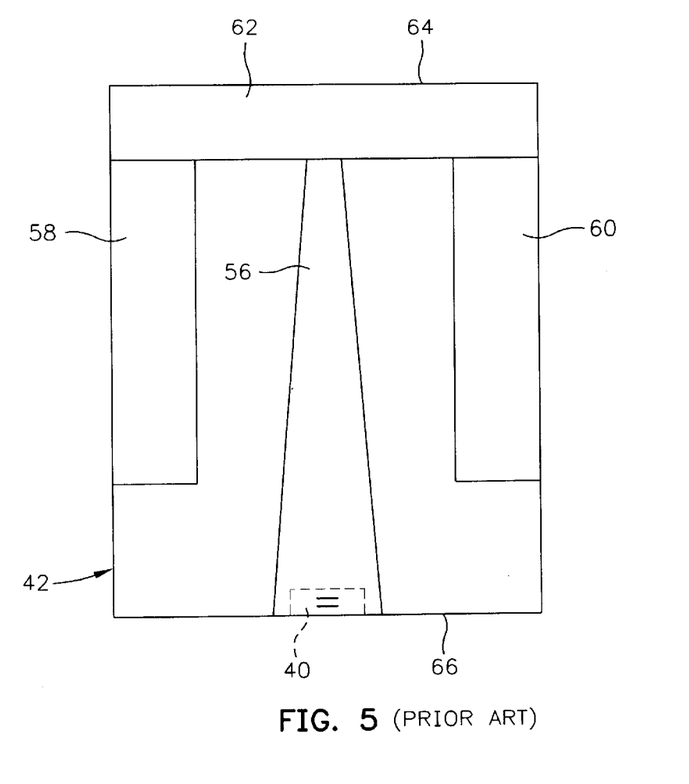
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
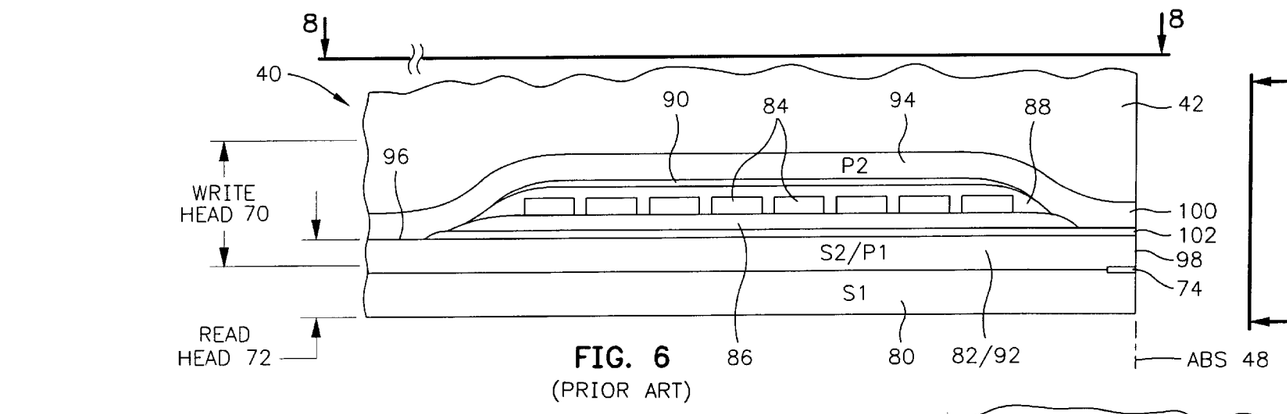
FIG. 6 is a partial view of the slider and a merged magnetic head as seen in plane 6—6 of FIG. 2.
Figure 7:
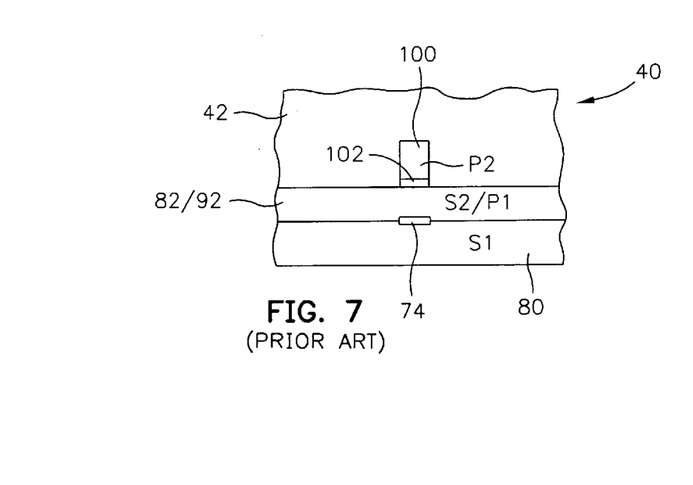
FIG. 7 is a partial ABS view of the slider taken along plane 7—7 of FIG. 6 to show the read and write elements of the merged magnetic head.
Figure 8:
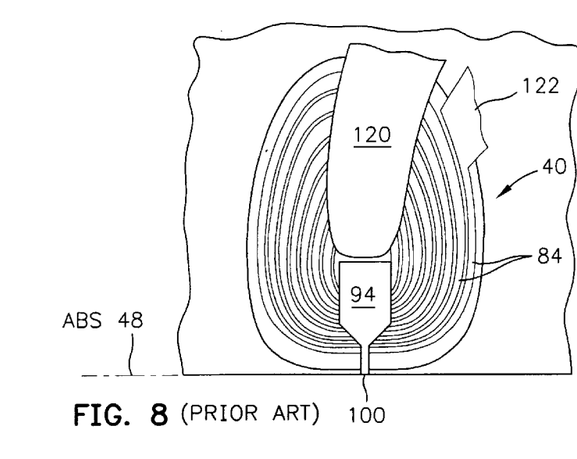
FIG. 8 is a view taken along plane 8—8 of FIG. 6 with all material above the coil layer and leads removed.

FIG. 6 is a side cross-sectional elevation view of a merged magnetic head 40, which includes a write head portion 70 and a read head portion 72, the read head portion employing a tunnel junction sensor 74 of the present invention. FIG. 7 is an ABS view of FIG. 6. The tunnel junction sensor 74 is sandwiched between ferromagnetic first and second shield layers 80 and 82. In response to external magnetic fields, the resistance of the spin valve sensor 74 changes. A tunneling current ($I_T$) conducted through the sensor causes these resistance changes to be manifested as potential changes. These potential changes are then processed as readback signals by the processing circuitry 50 shown in FIG. 3. The tunneling current ($I_T$) may be conducted through the tunnel junction sensor 74 perpendicular to the planes of its film surfaces by the first and second shield layers 80 and 82 which serve as first and second leads. In a piggyback head the second shield layer and the first pole piece layer are separate layers which are separated by a nonmagnetic isolation layer.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

The Invention

Figure 9:
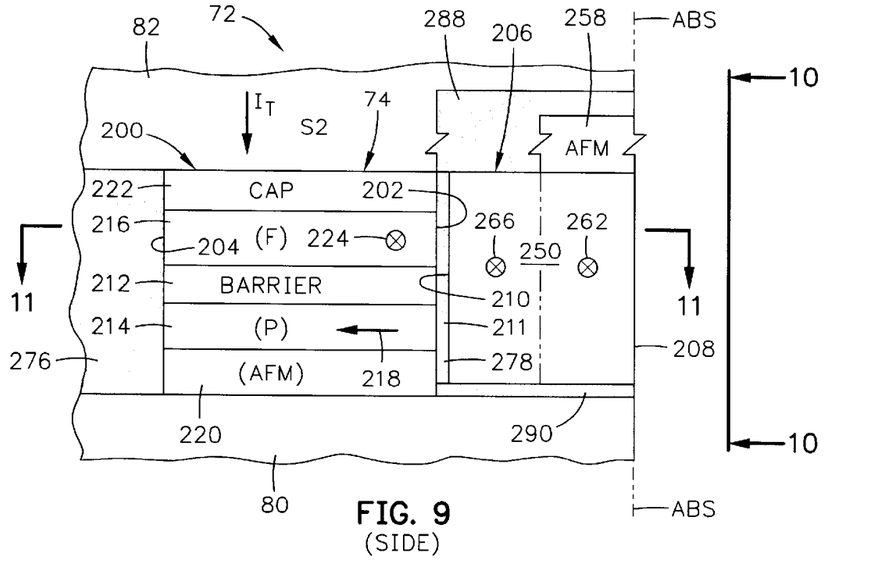
FIG. 9 is a longitudinal cross-sectional view through a first embodiment of the present flux guide and tunnel junction sensor.

FIG. 9 is a longitudinal cross-sectional view of the present read head 72 with a tunnel junction sensor 200 located between the first and second shield layers 80 and 82. The tunnel junction sensor 200 has front and back surfaces 202 and 204 and is recessed in the head from the ABS. A flux guide 206 has front and back surfaces 208 and 210 wherein the front surface 208 forms a portion of the ABS and the back surface 210 is magnetically coupled to the front surface 202 of the tunnel junction sensor 200 with a thin nonmagnetic electrically nonconductive layer 211 located therebetween.

The tunnel junction sensor has an electrically nonconductive barrier layer 212 which is located between a pinned layer (P) 214 and a free layer (F) 216. The pinned layer 214 has a magnetic moment 218 which is pinned by an antiferromagnetic (AFM) pinning layer 220 perpendicular to the ABS in a direction from left to right or from right to left, as shown in FIG. 9. A cap layer 222 may be provided on top of the free layer 216 for protecting the sensor from subsequent processing steps. The free layer 216 has a magnetic moment 224 which is oriented parallel to the ABS and to the major planes of the layers. When a field signal $H_{AP}$ from a rotating magnetic disk is sensed by the tunnel junction sensor 200 the magnetic moment 224 of the free layer rotates. When the free layer 224 is rotated into the head by the field signal from the rotating magnetic disk the magnetic moments 224 and 218 become more parallel which reduces the resistance of the sensor to a tunneling current $I_T$ and when the field signal from the rotating magnetic disk rotates the magnetic moment 224 outwardly from the head, the magnetic moments 224 and 218 become more antiparallel which increases the resistance of the tunnel junction sensor to the tunneling current $I_T$. These resistance changes are processed as playback signals by the processing circuitry 50 in FIG. 3. The tunneling current $I_T$ may be conducted through the tunnel junction sensor by the first and second shield layers 80 and 82 which are electrically conductive. The connection of the source of the tunneling current $I_T$ to the first and second shield layers is not shown.

Figure 10:
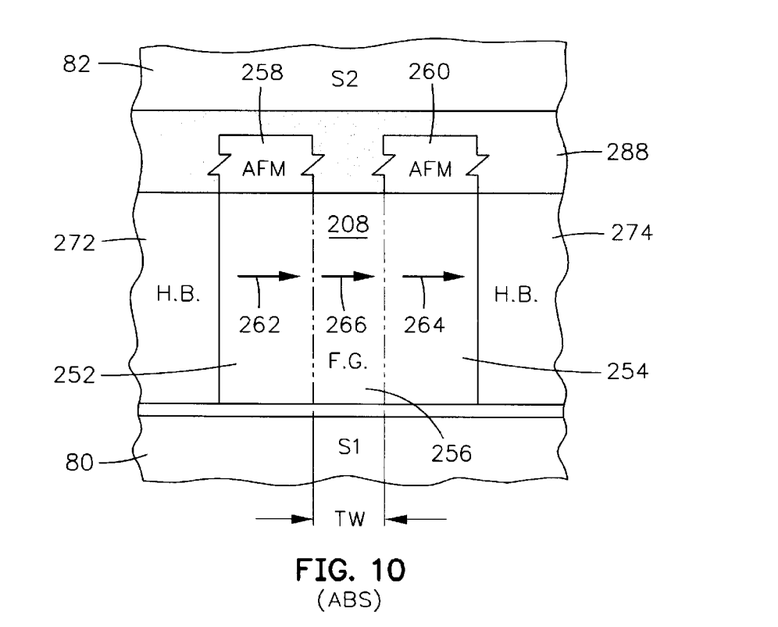
FIG. 10 is a view taken along plane 10—10 of FIG. 9.
Figure 11:
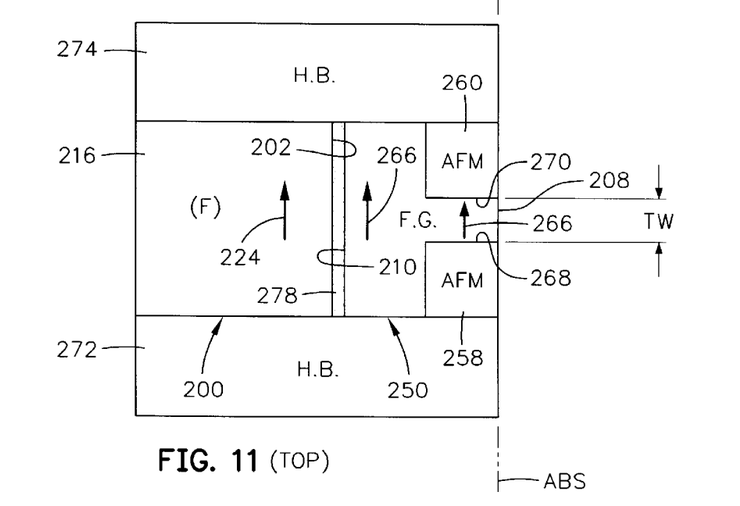
FIG. 11 is a view taken along plane 11—11 of FIG. 9.

FIGS. 9, 10 and 11 illustrate a first embodiment of the present invention. As shown in these figures, the flux guide 206 includes a ferromagnetic flux guide body 250 which has the aforementioned front and back surfaces 208 and 210 wherein the front surface forms a portion of the ABS and the back surface 210 is magnetically coupled to the tunnel junction sensor 200. The flux guide body has first and second side portions 252 and 254 and a middle portion 256 with the middle portion located between the first and second side portions. First and second antiferromagnetic (AFM) layers 258 and 260 are provided wherein the first antiferromagnetic layer is magnetically coupled to the first side portion 252 and the second antiferromagnetic layer is magnetically coupled to the second side portion 254 for pinning magnetic moments 262 and 264. With this arrangement only a magnetic moment 266 of the middle portion defines a track width (TW) of the sensor and responds to field signals from the rotating magnetic disk. In this first embodiment the first and second antiferromagnetic layers 258 and 260 interface top portions of the first and second side portions 252 and 254 of the flux guide body.

The first and second antiferromagnetic layers have side walls 268 and 270 which are perpendicular to the ABS and spaced apart by the track width. Accordingly, as the magnetic head is lapped at the ABS the track width will remain constant. It should be noted that each of the front surface 202 of the tunnel junction sensor and the back surface 210 of the flux guide body, as seen in FIG. 11, have a width as measured parallel to the ABS and major planes of the layers that is greater than the track width (TW). By making the tunnel junction sensor with larger width dimensions, its resistance to the tunneling current ($I_T$) is lower which promotes a higher magnetoresistive coefficient dr/R. In a preferred embodiment the read head is provided with first and second hard bias (HB) layers 272 and 274 which interface first and second side surfaces of each of the flux guide body 250 and the tunnel junction sensor 200 for stabilizing the magnetization of the flux guide 206 and the free layer 216 of the tunnel junction sensor. As seen in FIG. 10, a magnetostatic coupling between the first and second hard bias layers 272 and 274 and the first and second side portions 252 and 254 apply a biasing force which is in the same direction as the pinned directions of the magnetic moments 262 and 264. It should be noted from FIG. 10 that the magnetic moments 262 and 264 are pinned in their directions and will not respond to field signals from the rotating magnetic disk while the magnetic moment 266 of the middle portion will be highly responsive to signal fields from the rotating magnetic disk. Various nonmagnetic electrically nonconductive layers are provided to insulate components from one another. An insulation layer 276 insulates the first and second shield layers 80 and 82 from one another; an insulation layer 278 insulates the back surface 210 of the flux guide body from the front surface 202 of the tunnel junction sensor with sufficient thickness, such as 10 Å to 20 Å, to permit a magnetic coupling therebetween; an insulation layer 288 insulates a top portion of the flux guide body and the antiferromagnetic layers 258 and 260 from the second shield layer 82; and an insulation layer 290 insulates a bottom of the flux guide body from the first shield layer 80.

Figure 12:
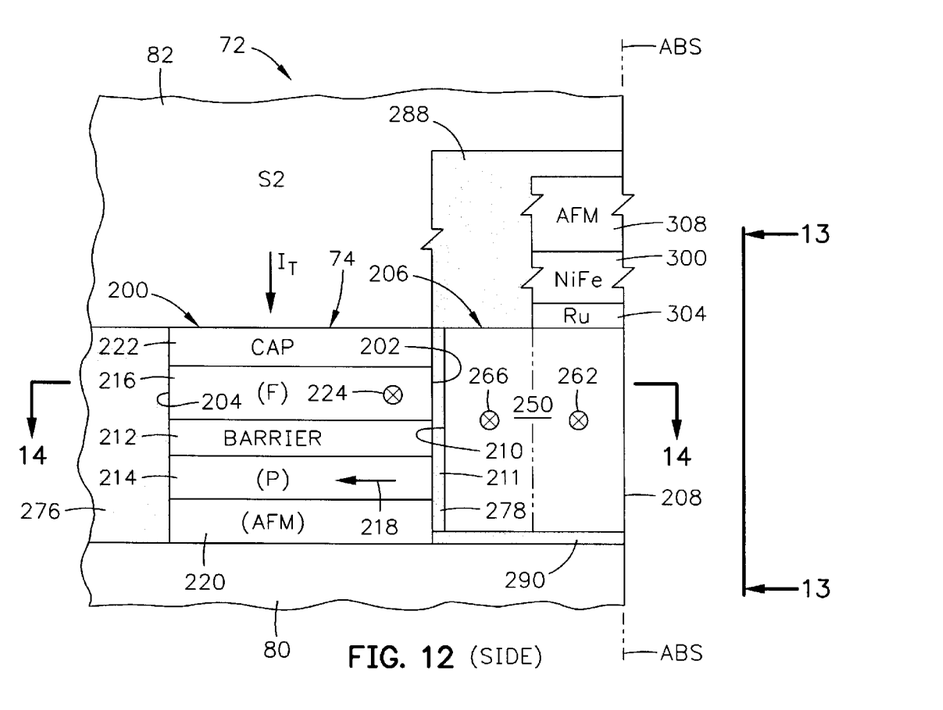
FIG. 12 is a longitudinal cross-sectional view through a second embodiment of the present flux guide and tunnel junction sensor.
Figure 13:
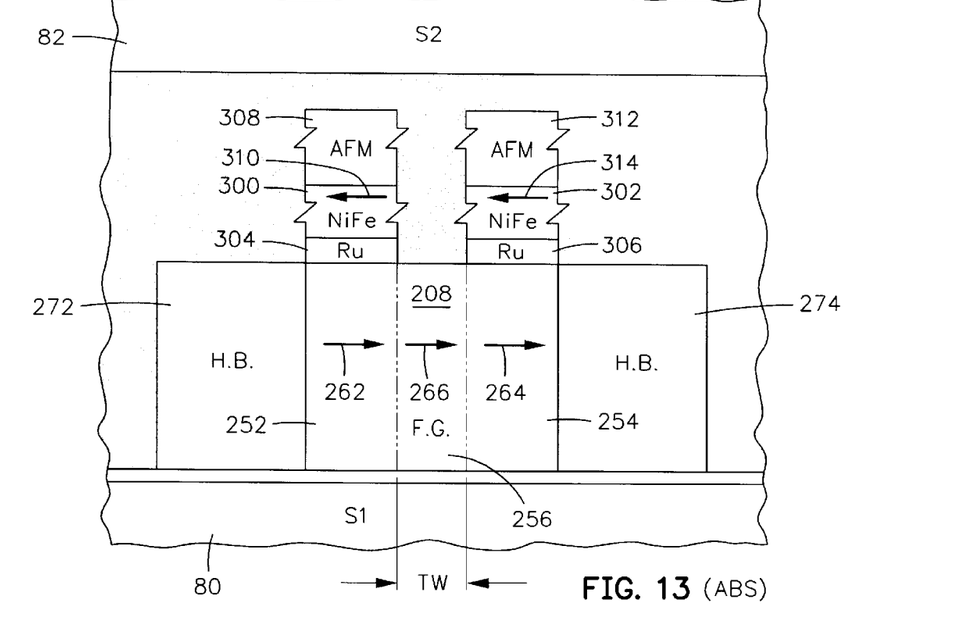
FIG. 13 is a view taken along plane 13—13 of FIG. 12.
Figure 14:
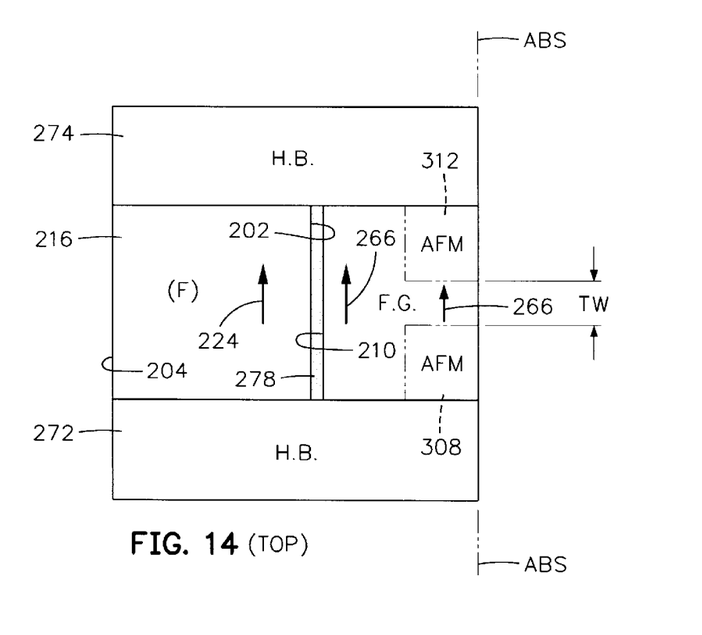
FIG. 14 is a view taken along plane 14—14 of FIG. 12.

A second embodiment of the present invention is illustrated in FIGS. 12, 13 and 14. This embodiment is the same as the first embodiment, except for the mode for pinning of the magnetic moments 262 and 264 of the first and second side portions of the flux guide body 206. In this embodiment, the first and second moments 262 and 264 are pinned by an antiparallel coupling wherein each of the first and second portions 252 and 254 of the flux guide body are one of the antiparallel (AP) pinned layers of an antiparallel (AP) pinned layer structure. An antiparallel pinned layer structure is fully described in commonly assigned U.S. Pat. No. 5,465,185, which is incorporated by reference herein. As shown in FIGS. 12 and 13, first and second ferromagnetic layers 300 and 302, which may be nickel iron ($Ni_{83}Fe_{17}$), are provided wherein each ferromagnetic layer serves as one AP pinned layer in the AP pinned layer structure. A first antiparallel coupling layer 304 is located between and interfaces each of the first ferromagnetic layer 300 and the first side portion 252 of the flux guide body so as to antiparallel couple the first ferromagnetic layer 300 and the first side portion 252 of the flux guide body. A second antiparallel coupling layer 306 is also provided and is located between and interfaces each of the second ferromagnetic layer 302 and the second side portion 254 of the flux guide body so as to antiparallel couple the second ferromagnetic layer 302 and the second side portion 254 of the flux guide body. A first antiferromagnetic layer 308 is exchange coupled to the first ferromagnetic layer 300 for pinning a magnetic moment 310 of the first ferromagnetic layer parallel to the ABS and to the major planes of the layers, which causes the magnetic moment 262 of the first side portion to be pinned antiparallel thereto. A second antiferromagnetic layer 312 is exchange coupled to the second ferromagnetic layer 302 for pinning a magnetic moment 314 of the second ferromagnetic layer parallel to the ABS and to the major planes of the layers so that the magnetic moment 264 of the second side portion is pinned antiparallel thereto. Again, it is preferred in this embodiment that the first and second hard bias layers 272 and 274 bias the magnetic moments 262 and 264 of the first and second side portions in the same direction as their pinned direction. This embodiment more rigidly pins the magnetic moments 262 and 264 than the first embodiment and is a preferred embodiment of the present invention. The magnetic moment 266 of the middle portion of the flux guide body is highly responsive to field signals from the rotating magnetic disk. Like the first embodiment, the antiparallel coupling layers 304 and 306, the ferromagnetic layers 300 and 302 and the antiferromagnetic layers 308 and 312 have side surfaces which are perpendicular to the ABS so that lapping will not change the track width.

Discussion

The antiferromagnetic layers 258, 308 and 312 are preferably platinum manganese ($Pt_{50}Mn_{50}$) and are approximately 150 Å thick. The first and second antiparallel coupling layers 304 and 306 are preferably 8 Å of ruthenium (Ru) and the first and second ferromagnetic layers 302 and 303 and the flux guide body 250 are preferably nickel iron ($Ni_{83}Fe_{17}$) with each of the ferromagnetic layers and flux guide body being about 100 Å thick. The invention also includes the method of making the embodiments of the invention described hereinabove.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head which has an air bearing surface (ABS), comprising:

a tunnel junction sensor that has front and back surfaces that are recessed from said ABS;

a flux guide including:

a ferromagnetic flux guide body having front and back surfaces wherein the front surface forms a portion of the ABS and the back surface is magnetically coupled to the tunnel junction sensor;

the flux guide body having first and second side portions and a middle portion with the middle portion located between the first and second side portions;

first and second antiferromagnetic layers;

the first antiferromagnetic layer being magnetically coupled to the first side portion and the second antiferromagnetic layer being magnetically coupled to the second side portion for pinning magnetic moments of the first and second side portions so that only a magnetic moment of the middle portion defines a track width of the sensor and responds to a field signal from a magnetic medium; and the first and second antiferromagnetic layers having side walls which are perpendicular to the ABS and spaced apart by said track width; and each of the front surface of the tunnel junction sensor and the back surface of the flux guide having a width as measured parallel to the ABS and major planes of said layers that is greater than said track width.

2. A magnetic read head as claimed in claim 1 further including:

ferromagnetic first and second shield layers; and the tunnel junction sensor being located between the first and second shield layers;

the tunnel junction sensor including:
a ferromagnetic pinned layer that has a magnetic moment;
an antiferromagnetic pinning layer exchange coupled to the pinned layer for pinning the magnetic moment of the pinned layer;
a ferromagnetic free layer which has a magnetic moment; and
a nonmagnetic electrically insulative barrier layer located between the free layer and the pinned layer.

3. A magnetic read head as claimed in claim 2 wherein the first and second antiferromagnetic layers interface the first and second side portions of the flux guide body.

4. A magnetic read head as claimed in claim 3 including:
first and second hard bias layers interfacing the first and second side portions respectively for biasing the magnetic moments of the first and second side portions in the same direction as the pinned directions of the magnetic moments of the first and second side portions.

5. A magnetic read head as claimed in claim 2 including:
first and second ferromagnetic layers;
a first antiparallel coupling layer located between and interfacing each of the first ferromagnetic layer and said first side portion of the flux guide body so as to antiparallel couple the first ferromagnetic layer and the first side portion of the flux guide body;
a second antiparallel coupling layer located between and interfacing each of the second ferromagnetic layer and said second side portion of the flux guide body so as to antiparallel couple the second ferromagnetic layer and the second side portion of the flux guide body;
the first antiferromagnetic layer being exchange coupled to the first ferromagnetic layer for pinning a magnetic moment of the first ferromagnetic layer parallel to the ABS and to major planes of the layers so that said magnetic moment of the first side portion is pinned antiparallel thereto; and
the second antiferromagnetic layer being exchange coupled to the second ferromagnetic layer for pinning a magnetic moment of the second ferromagnetic layer parallel to the ABS and the major planes of the layers so that said magnetic moment of the second side portion is pinned antiparallel thereto.

6. A magnetic read head as claimed in claim 5 including:
first and second hard bias layers interfacing the first and second side portions respectively for biasing the magnetic moments of the first and second side portions in the same direction as the pinned directions of the magnetic moments of the first and second side portions.

7. A magnetic head assembly having an air bearing surface (ABS), comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
a read head including:
a ferromagnetic first shield layer;
a tunnel junction sensor located between the first shield layer and the first pole piece layer;
the tunnel junction sensor having front and back surfaces that are recessed from said ABS;
a flux guide including:
a ferromagnetic flux guide body having front and back surfaces wherein the front surface forms a portion of the ABS and the back surface is magnetically coupled to the tunnel junction sensor;
the flux guide body having first and second side portions and a middle portion with the middle portion located between the first and second side portions;
first and second antiferromagnetic layers;
the first antiferromagnetic layer being magnetically coupled to the first side portion and the second antiferromagnetic layer being magnetically coupled to the second side portion for pinning magnetic moments of the first and second side portions so that only a magnetic moment of the middle portion defines a track width of the sensor and responds to a field signal from a magnetic medium; and
the first and second antiferromagnetic layers having side walls which are perpendicular to the ABS and spaced apart by said track width; and
each of the front surface of the tunnel junction sensor and the back surface of the flux guide having a width as measured parallel to the ABS and major planes of said layers that is greater than said track width.

8. A magnetic head assembly as claimed in claim 7 further including:
the tunnel junction sensor including:
a ferromagnetic pinned layer that has a magnetic moment;
an antiferromagnetic pinning layer exchange coupled to the pinned layer for pinning the magnetic moment of the pinned layer;
a ferromagnetic free layer which has a magnetic moment; and
a nonmagnetic electrically insulative barrier layer located between the free layer and the pinned layer.

9. A magnetic head assembly as claimed in claim 8 wherein the first and second antiferromagnetic layers interface the first and second side portions of the flux guide body.

10. A magnetic head assembly as claimed in claim 9 including:
first and second hard bias layers interfacing the first and second portions respectively for biasing the magnetic moments of the first and second side portions in the same direction as the pinned directions of the magnetic moments of the first and second side portions.

11. A magnetic head assembly as claimed in claim 8 including:
first and second ferromagnetic layers;
a first antiparallel coupling layer located between and interfacing each of the first ferromagnetic layer and said first side portion of the flux guide body so as to antiparallel couple the first ferromagnetic layer and the first side portion of the flux guide body;
a second antiparallel coupling layer located between and interfacing each of the second ferromagnetic layer and said second side portion of the flux guide body so as to antiparallel couple the second ferromagnetic layer and the second side portion of the flux guide body; and
the first antiferromagnetic layer being exchange coupled to the first ferromagnetic layer for pinning a magnetic moment of the first ferromagnetic layer parallel to the ABS and to major planes of the layers so that said magnetic moment of the first side portion is pinned antiparallel thereto; and the second antiferromagnetic layer being exchange coupled to the second ferromagnetic layer for pinning a magnetic moment of the second ferromagnetic layer parallel to the ABS and the major planes of the layers so that said magnetic moment of the second side portion is pinned antiparallel thereto.

12. A magnetic head assembly as claimed in claim 11 including:

first and second hard bias layers interfacing the first and second side portions respectively for biasing the magnetic moments of the first and second side portions in the same direction as the pinned directions of the magnetic moments of the first and second side portions.

13. A magnetic disk drive including at least one magnetic head assembly that has an a write head, a read head and an air bearing surface (ABS) comprising:

the write head including:
ferromagnetic first and second pole piece layers that have a yoke portion located between a pole tip portion and a back gap portion;
a nonmagnetic write gap layer located between the pole tip portions of the first and second pole piece layers
an insulation stack with at least one coil layer embedded therein located between the yoke portions of the first and second pole piece layers; and
the first and second pole piece layers being connected at their back gap portions; and the read head including:
a first shield layer;
a tunnel junction sensor located between the first shield layer and the first pole piece layer;

a flux guide including:
a ferromagnetic flux guide body having front and back surfaces wherein the front surface forms a portion of the ABS and the back surface is magnetically coupled to the tunnel junction sensor;
the flux guide body having first and second side portions and a middle portion with the middle portion located between the first and second side portions;
first and second antiferromagnetic layers;
the first antiferromagnetic layer being magnetically coupled to the first side portion and the second antiferromagnetic layer being magnetically coupled to the second side portion for pinning magnetic moments of the first and second side portions so that only a magnetic moment of the middle portion defines a track width of the sensor and responds to a field signal from a magnetic medium; and
the first and second antiferromagnetic layers having side walls which are perpendicular to the ABS and are spaced apart by said track width; and each of the front surface of the tunnel junction sensor and the back surface of the flux guide having a width as measured parallel to the ABS and major planes of said layers that is greater than said track width;

a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and a processor connected to the magnetic head assembly, to the spindle motor and to the actuator for exchanging signals with the magnetic head assembly, for controlling movement of the magnetic disk and for controlling the position of the magnetic head assembly.

14. A magnetic disk drive as claimed in claim 13 further including:

the tunnel junction sensor including:
a ferromagnetic pinned layer that has a magnetic moment;
an antiferromagnetic pinning layer exchange coupled to the pinned layer for pinning the magnetic moment of the pinned layer;
a ferromagnetic free layer which has a magnetic moment; and
a nonmagnetic electrically insulative barrier layer located between the free layer and the pinned layer.

15. A magnetic disk drive as claimed in claim 14 wherein the first and second antiferromagnetic layers interface the first and second side portions of the flux guide body.

16. A magnetic disk drive as claimed in claim 15 including:

first and second hard bias layers interfacing the first and second side portions respectively for biasing the magnetic moments of the first and second side portions in the same direction as the pinned directions of the magnetic moments of the first and second side portions.

17. A magnetic disk drive as claimed in claim 14 including:

first and second ferromagnetic layers;
a first antiparallel coupling layer located between and interfacing each of the first ferromagnetic layer and said first side portion of the flux guide body so as to antiparallel couple the first ferromagnetic layer and the first side portion of the flux guide body;
a second antiparallel coupling layer located between and interfacing each of the second ferromagnetic layer and said second side portion of the flux guide body so as to antiparallel couple the second ferromagnetic layer and the second side portion of the flux guide body; and
the first antiferromagnetic layer being exchange coupled to the first ferromagnetic layer for pinning a magnetic moment of the first ferromagnetic layer parallel to the ABS and to major planes of the layers so that said magnetic moment of the first side portion is pinned antiparallel thereto; and
the second antiferromagnetic layer being exchange coupled to the second ferromagnetic layer for pinning a magnetic moment of the second ferromagnetic layer parallel to the ABS and the major planes of the layers so that said magnetic moment of the second side portion is pinned antiparallel thereto.

18. A magnetic disk drive as claimed in claim 17 including:

first and second hard bias layers interfacing the first and second side portions respectively for biasing the magnetic moments of the first and second side portions in the same direction as the pinned directions of the magnetic moments of the first and second side portions.

19. A method of making a magnetic read head which has an air bearing surface (ABS), comprising the steps of:

forming a tunnel junction sensor that has front and back surfaces that are recessed from said ABS;
making a flux guide including the steps of:
forming a ferromagnetic flux guide body having front and back surfaces wherein the front surface forms a portion of the ABS and the back surface is magnetically coupled to the tunnel junction sensor;

forming the flux guide body with first and second side portions and a middle portion with the middle portion located between the first and second side portions;

forming first and second antiferromagnetic layers with the first antiferromagnetic layer magnetically coupled to the first side portion and the second antiferromagnetic layer magnetically coupled to the second side portion for pinning magnetic moments of the first and second side portions so that only a magnetic moment of the middle portion defines a track width of the sensor and responds to a field signal from a magnetic medium; and forming the first and second antiferromagnetic layers with side walls which are perpendicular to the ABS and are spaced apart by said track width; and forming each of the front surface of the tunnel junction sensor and the back surface of the flux guide with a width as measured parallel to the ABS and major planes of said layers that is greater than said track width.

20. A method as claimed in claim 19 further including the steps of:

forming ferromagnetic first and second shield layers with the tunnel junction sensor located between the first and second shield layers;

making the tunnel junction sensor including the steps of:
forming a ferromagnetic pinned layer with a magnetic moment;
forming an antiferromagnetic pinning layer exchange coupled to the pinned layer for pinning the magnetic moment of the pinned layer;
forming a ferromagnetic free layer with a magnetic moment; and
forming a nonmagnetic electrically nonconductive barrier layer between the free layer and the pinned layer.

21. A method as claimed in claim 20 including interfacing the first and second antiferromagnetic layers with the first and second side portions of the flux guide body.

22. A method as claimed in claim 21 including the step of:
forming first and second hard bias layers interfacing the first and second side portions respectively for biasing the magnetic moments of the first and second portions in the same direction as the pinned directions of said magnetic moments.

23. A method as claimed in claim 20 including the steps of:
forming first and second ferromagnetic layers;
forming a first antiparallel coupling layer between and interfacing each of the first ferromagnetic layer and said first side portion of the flux guide body so as to antiparallel couple the first ferromagnetic layer and the first side portion of the flux guide body;
forming a second antiparallel coupling layer located between and interfacing each of the second ferromagnetic layer and said second side portion of the flux guide body so as to antiparallel couple the second ferromagnetic layer and the second side portion of the flux guide body;
exchange coupling the first antiferromagnetic layer to the first ferromagnetic layer for pinning a magnetic moment of the first ferromagnetic layer parallel to the ABS and to major planes of the layers so that said magnetic moment of the first side portion is pinned antiparallel thereto; and exchange coupling the second antiferromagnetic layer to the second ferromagnetic layer for pinning a magnetic moment of the second ferromagnetic layer parallel to the ABS and the major planes of the layers so that said magnetic moment of the second side portion is pinned antiparallel thereto.

24. A method as claimed in claim 23 including the step of:
forming first and second hard bias layers interfacing the first and second side portions respectively for biasing the magnetic moments of the first and second side portions in the same direction as the pinned directions of said magnetic moments.

25. A method of making magnetic head assembly that has an air bearing surface (ABS), comprising the steps of:
making a write head including the steps of:
forming ferromagnetic first and second pole piece layers in pole tip, yoke and back gap regions wherein the yoke region is located between the pole tip and back gap regions;
forming a nonmagnetic nonconductive write gap layer between the first and second pole piece layers in the pole tip region;
forming an insulation stack with at least one coil layer embedded therein between the first and second pole piece layers in the yoke region; and
connecting the first and pole piece layers at said back gap region; and
making a read head including the steps of:
forming a first shield layer; and
forming a tunnel junction sensor between the first shield layer and the first pole piece layer;
forming the tunnel junction sensor with front and back surfaces that are recessed from said ABS;
making a flux guide including the steps of:
forming a ferromagnetic flux guide body having front and back surfaces wherein the front surface forms a portion of the ABS and the back surface is magnetically coupled to the tunnel junction sensor;
forming the flux guide body with first and second side portions and a middle portion with the middle portion located between the first and second side portions;
forming first and second antiferromagnetic layers with the first antiferromagnetic layer magnetically coupled to the first side portion and the second antiferromagnetic layer magnetically coupled to the second side portion for pinning magnetic moments of the first and second side portions so that only a magnetic moment of the middle portion defines a track width of the sensor and responds to a field signal from a magnetic medium; and
forming the first and second antiferromagnetic layers with side walls which are perpendicular to the ABS and are spaced apart by said track width; and
forming each of the front surface of the tunnel junction sensor and the back surface of the flux guide with a width as measured parallel to the ABS and major planes of said layers that is greater than said track width.

26. A method as claimed in claim 25 wherein a making of the write head comprises the steps of:
forming a ferromagnetic pinned layer with a magnetic moment;
forming an antiferromagnetic pinning layer exchange coupled to the pinned layer for pinning the magnetic moment of the pinned layer;
forming a ferromagnetic free layer with a magnetic moment; and forming a nonmagnetic electrically nonconductive barrier layer between the free layer and the pinned layer.

27. A method as claimed in claim 26 including interfacing the first and second antiferromagnetic layers with the first and second side portions of the flux guide body.

28. A method as claimed in claim 27 including the step of:

forming first and second hard bias layers interfacing the first and second side portions respectively for biasing the magnetic moments of the first and second side portions in the same direction as the pinned directions of said magnetic moments.

29. A method as claimed in claim 26 including the steps of:

forming first and second ferromagnetic layers;

forming a first antiparallel coupling layer between and interfacing each of the first ferromagnetic layer and said first side portion of the flux guide body so as to antiparallel couple the first ferromagnetic layer and the first side portion of the flux guide body;

forming a second antiparallel coupling layer located between and interfacing each of the second ferromagnetic layer and said second side portion of the flux guide body so as to antiparallel couple the second ferromagnetic layer and the second side portion of the flux guide body;

exchange coupling the first antiferromagnetic layer to the first ferromagnetic layer for pinning a magnetic moment of the first ferromagnetic layer parallel to the ABS and to major planes of the layers so that said magnetic moment of the first side portion is pinned antiparallel thereto; and exchange coupling the second antiferromagnetic layer to the second ferromagnetic layer for pinning a magnetic moment of the second ferromagnetic layer parallel to the ABS and the major planes of the layers so that said magnetic moment of the second side portion is pinned antiparallel thereto.

30. A method as claimed in claim 29 including the step of:

forming first and second hard bias layers interfacing the first and second side portions respectively for biasing the magnetic moments of the first and second side portions in the same direction as the pinned directions of said magnetic moments.

* * * * *